US008244071B2

(12) United States Patent
Xiong et al.

(10) Patent No.: US 8,244,071 B2
(45) Date of Patent: Aug. 14, 2012

(54) NON-DYADIC SPATIAL SCALABLE WAVELET TRANSFORM

(75) Inventors: Ruiqin Xiong, Beijing (CN); Ji-Zheng Xu, Beijing (CN); Feng Wu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1202 days.

(21) Appl. No.: 11/563,629

(22) Filed: Nov. 27, 2006

(65) Prior Publication Data

US 2008/0123983 A1    May 29, 2008

(51) Int. Cl.
G06K 9/32        (2006.01)
G06K 9/36        (2006.01)
(52) U.S. Cl. ........................ 382/298; 382/240
(58) Field of Classification Search .................. None
See application file for complete search history.

(56) References Cited

U.S. PATENT DOCUMENTS

| | | |
|---|---|---|
| 7,006,568 B1 | 2/2006 | Gu et al. |
| 2003/0185454 A1 | 10/2003 | Simard et al. |
| 2004/0114689 A1 | 6/2004 | Zhang et al. |
| 2004/0136602 A1* | 7/2004 | Nagaraj et al. ............... 382/240 |
| 2004/0213477 A1 | 10/2004 | Nakajima et al. |
| 2004/0234166 A1 | 11/2004 | Nakajima et al. |
| 2005/0031214 A1 | 2/2005 | Zhang et al. |
| 2005/0286795 A1 | 12/2005 | Zhang |
| 2006/0008164 A1 | 1/2006 | Wu et al. |
| 2006/0012680 A1 | 1/2006 | Bourge |

FOREIGN PATENT DOCUMENTS

WO  WO2004036919(A1)   4/2004

OTHER PUBLICATIONS

Xiong et al. "A lifting based wavelet transformation supporting Non-dyadic Spatial Scalability", Microsoft Research Asia.*
Claypoole et al, "Adaptive Wavelet Transforms via Lifting", May 1999, IEEE Transactions on Signal Processing, 29 pgs.
Secker et al, "Motion-Compensated Highly Scalable Video Compression Using an Adaptive 3D Wavelet Transform Based on Lifing", Oct. 2001, 2001 IEEE Intl Conf on Image Processing, 4 pgs.
Tillier et al, "Highly Scalable Video Coding by Bidirectional Predict-Update 3-Band Schemes", May 2004, IEEE Intl Conf on Acoustics, Speech and Signal Processing, 4 pgs.
Yoo et al, "A Unified Framework for Wavelet Transforms Based on The Lifting Scheme", Oct. 2001, 2001 IEEE Intl Conf on Image Processing, 4 pgs.

\* cited by examiner

*Primary Examiner* — Randolph I Chu
(74) *Attorney, Agent, or Firm* — Lee & Hayes, PLLC

(57) ABSTRACT

A non-dyadic spatial scalable wavelet transform may scale an original digital video frame or digital image at a non-dyadic ratio. The digital video frame or digital image is quantized to create a set of data representing the digital video frame or digital image. The set of data is then input to the non-dyadic spatial scalable wavelet transform. The non-dyadic spatial scalable wavelet transform may then transform the data associated with a first pixel to a high-pass coefficient and use the high-pass coefficient to transform the data associated with a second and third pixel to low-pass coefficients. The low-pass coefficients may then be converted to a digital image for viewing.

20 Claims, 3 Drawing Sheets

NON-DYADIC SPATIAL SCALABLE WAVELET TRANSFORM

BACKGROUND

A producer of digital multimedia content such as digital video or images may seek to distribute content over a network such as the Internet. A network may have a finite amount of bandwidth available to serve the digital multimedia to a large number of clients. Since the transmission bandwidth is finite, a producer of the digital multimedia content may seek to compress the amount of data associated with the digital multimedia content. By compressing the amount of data associated with the digital multimedia content, a producer may serve a larger number of requests over the fixed amount of bandwidth.

Current digital video and digital image compression techniques focus on reducing the amount of information required to accurately reproduce an original frame of digital video or digital still image. An original digital video or image may be compressed and decompressed using a computer software module known as a codec, or, compressor/decompressor. The data associated with a digital video or image may be both compressed and decompressed using the same codec.

There are currently many types of clients capable of displaying digital video or images. For example, a typical personal computer (PC), portable telephones, personal digital assistants (PDAs), portable music and video players, television set-top boxes, video game consoles, and the like. Each of these devices may display digital video or images at a different resolution; for example, a portable telephone may have a much smaller screen and corresponding resolution than a high definition television connected to a set-top box.

It is therefore desirable for an application intended to display compressed digital video or image signal to include spatial scalability functionality. Spatial scalability may be referred to as a function of a digital video or image codec to resize a digital video or image to different size or resolution. That is, the codec may extract or filter a subset of the compressed digital video or image signal such that an accurate representation of the digital video or image may be viewed at a different size or different resolution.

For example, an original digital video may be produced at a resolution of 640 pixels by 480 pixels, which would typically be viewed on a personal computer monitor. A display application making use of a codec on the personal computer may therefore decompress and display the digital video at the original resolution of 640 pixels by 480 pixels. However, should the digital video be sent to a portable telephone with a resolution of 320 pixels by 240 pixels, a display application may make use of a codec to extract or filter a subset of the original digital video to produce an accurate representation of the original digital video at the lower resolution.

Presently, spatial scalability functionality is focused on dyadic spatial scaling schemes. A current codec may implement a dyadic spatial scaling scheme that halves the resolution of the compressed digital video or image signal at each resolution reduction step. That is, the resolution may be scaled at a ratio of 2:1. For example, a user may view a digital video of 640 pixels by 480 pixels using a multimedia application on a personal computer. The user may resize the application window to a smaller size. However, due to the dyadic spatial scalability of the codec, the resolution of the digital video will first shrink to 320 pixels by 240 pixels. If the user continues to shrink the application window, the resolution will be halved again to 160 pixels by 120 pixels.

Current spatial scalability schemes are focused on dyadic spatial scalability schemes due to the properties of the lifting wavelet algorithms used to extract the lower resolution subset of the compressed digital video or image. In particular, current digital video and image codecs may employ computer executable implementations of lifting scheme wavelet algorithms. Such lifting wavelet algorithms may be recursive in that the output of a first step of the algorithm becomes the input for a following step of the algorithm. Furthermore, each recursive step of the lifting wavelet algorithm halves the previous number of elements in the original data set representing the digital video or image signal.

While such dyadic spatial scalability codecs may effectively reduce the resolution or size of a compressed digital video or image by a factor of two, or, a ratio of 2:1, current uses of codecs may require resolution reduction by other factors. For example, a current high definition television signal of 1080 interlaced (1080i) may have a resolution of 1920 pixels by 1080 pixels. A current high definition signal of 720 progressive (720p) may have a resolution of 1280 pixels by 720 pixels. A set top box may be connected to a television set that only supports display of a 720 progressive image and not a 1080 interlaced image. It may be desirable for the set top box to scale the 1080 interlaced image to a 720 progressive image, a ratio of 3:2.

However, if the set top box executes a codec that implements a dyadic spatial scalability algorithm, the set top box can only reduce the 1080 interlaced resolution by half, to 960 pixels by 540 pixels. Therefore, the codec may not produce a properly spatially scaled digital video at the 720 progressive resolution. That is, the codec is not capable of scaling the 1080 interlaced image at a ratio of 3:2.

SUMMARY

The following presents a simplified summary of the disclosure in order to provide a basic understanding to the reader. This summary is not an extensive overview of the disclosure and this summary does not identify key/critical elements of the invention or delineate the scope of the invention. The purpose of this summary is to present some concepts disclosed herein in a simplified form as a prelude to the more detailed description that is presented later.

The present example provides mechanisms and techniques for a non-dyadic spatial scalable wavelet transform system. A digital video frame or digital image may be quantized to create a data set representing pixel data in the digital video frame or digital image. The pixels included in the data set may then be passed to a non-dyadic lifting wavelet transform.

Such a non-dyadic lifting wavelet transform may be accomplished by transforming data associated with a first pixel at a first position to a high-pass coefficient. Data associated with a second pixel at a second position adjacent to the first position and data associated with a third pixel at a third position adjacent to the second position may be transformed to low-pass coefficients using the high-pass coefficient. The non-dyadic lifting wavelet transform may be repeated for all pixel data in the data set. Once the non-dyadic lifting wavelet transform has completed, the low-pass coefficients may then be converted to a format suitable for display on a display device.

In addition, a set of predetermined parameters is selected for the high-pass transform using a first set of criteria. A set of predetermined parameters is also selected for the low-pass transform using a second set of criteria.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present examples may be constructed or utilized. The description sets forth the functions of the examples and the sequence of steps for constructing and operating the examples. However, the same or equivalent functions and sequences may be accomplished by different examples.

Although the present examples are described and illustrated herein as being implemented in a non-dyadic spatial scalable wavelet transform system, the system described is provided as an example and not a limitation. As those skilled in the art will appreciate, the present examples are suitable for application in a variety of different types of non-dyadic spatial scalable wavelet transform systems.

The present examples are based on the wavelet lifting scheme as disclosed by I. Daubechies and W. Sweldens, "Factoring wavelet transforms into lifting steps", J. Fourier Anal. Appl. vol. 4, pp. 247-269, 1998, which is hereby incorporated by reference.

Figure 1:
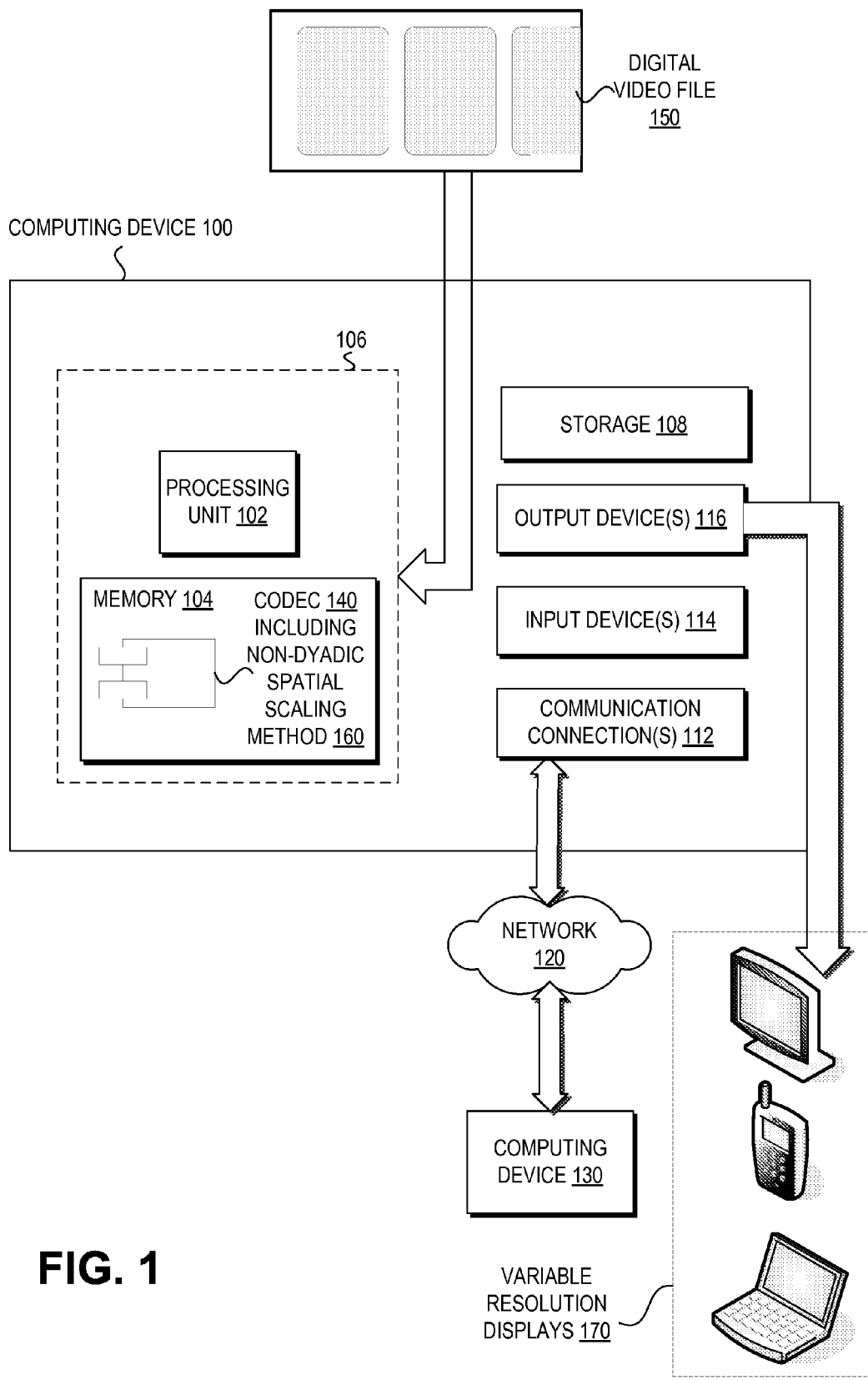
FIG. 1 is a block diagram showing an example operating environment in which an example non-dyadic spatial scalable codec may be executed.

FIG. 1 and the following discussion are intended to provide a brief, general description of a suitable computing environment to implement embodiments of a non-dyadic spatial scalable codec. The operating environment of FIG. 1 is only one example of a suitable operating environment and is not intended to suggest any limitation as to the scope of use or functionality of the operating environment. Other well known computing devices, environments, and/or configurations that may be suitable for use with embodiments described herein include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments of the invention will be described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 1 shows an example of a computing device 100 for implementing an example non-dyadic spatial scalable codec 140. In one configuration, the computing device 100 includes at least one processing unit 102 and a memory 104. Depending on the exact configuration and type of computing device, the memory 104 may be volatile (such as RAM), non-volatile (such as ROM, flash memory, etc.) or some combination of the two. This configuration is illustrated in FIG. 1 by the dashed line 106.

In other embodiments, the computing device 100 may include additional features and/or functionality. For example, the computing device 100 may also include additional storage (e.g., removable and/or non-removable) including, but not limited to, magnetic storage, optical storage, and the like. Such additional storage is illustrated in FIG. 1 by storage 108. In one embodiment, computer readable instructions to implement embodiments of the invention may be stored in storage 108. The storage 108 may also store other computer readable instructions to implement an operating system, an application program, and the like.

The term "computer readable media" as used herein includes computer storage media. Computer storage media includes volatile and nonvolatile, removable and non-removable media implemented in any method or technology for storage of information such as computer readable instructions or other data. The memory 104 and storage 108 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by the computing device 100. Any such computer storage media may be part of the computing device 100.

The computing device 100 may also include communication connection(s) 112 that allow the computing device 100 to communicate with other devices. The communication connection(s) 112 may include, but is not limited to, a modem, a Network Interface Card (NIC), or other interfaces for connecting the computing device 100 to other computing devices. The communication connection(s) 112 may include a wired connection or a wireless connection. The communication connection(s) 112 may transmit and/or receive communication media.

Communication media typically embodies computer readable instructions or other data in a "modulated data signal" such as a carrier wave or other transport mechanism and includes any information delivery media. The term "computer readable media" may include communication media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media.

The computing device 100 may include input device(s) 114 such as a keyboard, mouse, pen, voice input device, touch input device, infra-red cameras, video input devices, and/or any other input device. The output device(s) 116 such as one or more displays, speakers, printers, and/or any other output device may also be included in the computing device 100. The input device(s) 114 and output device(s) 116 may be connected to the computing device 100 via a wired connection, wireless connection, or any combination thereof. In one embodiment, a input device or a output device from another computing device may be used as a input device(s) 114 or output device(s) 116 for the computing device 100.

The components of the computing device 100 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of the computing device 100 may be interconnected by a network. For example, the memory 104 may be comprised of multiple physical memory units located in different physical locations interconnected by a network.

Those skilled in the art will realize that storage devices utilized to store computer readable instructions may be distributed across a network. For example, a computing device 130 accessible via a network 120 may store computer readable instructions to implement an example non-dyadic spatial scalable codec 140. The example non-dyadic spatial scalable codec 140 may further implement an example non-dyadic spatial scaling method 160. The computing device 100 may access the computing device 130 and download a part or all of the computer readable instructions for execution. Alternatively, the computing device 100 may download pieces of the computer readable instructions, as needed, or some instructions may be executed at the computing device 100 and some at the computing device 130. Those skilled in the art will also realize that all or a portion of the computer readable instructions may be carried out by a dedicated circuit, such as a Digital Signal Processor (DSP), programmable logic array, and the like.

The computing device 100 may implement an example non-dyadic spatial scalable codec 140 such that a digital video file 150, which may include a series of digital video frames or a single digital image, may be presented for viewing on a variable scaling ratio display 170. The variable scaling ratio display 170 may be connected to the computing device 100 via the output device(s) 116. In this example implementation, such an output device(s) 116 may be a video graphics adapter and such a variable scaling ratio display 170 may be a computer monitor, a portable telephone screen, a portable computer screen, and the like.

The example non-dyadic spatial scalable codec 140 is shown as included within the memory 104; however, the example non-dyadic spatial scalable codec 140 may be executed from any suitable location as already discussed. Furthermore, the digital video file 150 is shown as being processed by the processing unit 102 and the memory 104; however, the digital video file 150 may be processed by any combination of elements within the computing device 100.

The example non-dyadic spatial scalable codec 140 may perform several functions including decompressing and/or decoding the compressed or encoded portions of the digital video file 150 and performing a reverse quantization to create an image data set. Furthermore, the example non-dyadic spatial scaling method 160 may recursively reduce the resolution of the decompressed and/or decoded digital video file 150 by a ratio of N:M, where N is a factor of the scaled resolution and M is a factor of the original resolution. For example, a ratio of 3:2 may represent a scaled resolution two-thirds of the original resolution.

An example non-dyadic spatial scalable codec 140 may implement a non-dyadic lifting wavelet transform algorithm. Such a non-dyadic lifting wavelet transform algorithm may take a quantized digital video signal as input. The non-dyadic lifting wavelet transform splits a first portion of the elements of the quantized digital video signal to a first set of pixel data. The non-dyadic lifting wavelet transform splits a second portion of the elements to a second set of pixel data.

The non-dyadic lifting wavelet transform inputs the first set of pixel data to a "predict" process. Such a predict process may be used to "approximate" the elements of the first set of pixel data. The first set of pixel data is linearly combined with the output of the "predict" process. The result of the "predict" process is used as input to the "update" process. The "update" process may filter a portion of the linear combination of the first set of pixel data and the results of the "predict" process. The result of the "update" process may then be linearly combined with the second process to produce a scaled version of the quantized video.

An example non-dyadic lifting wavelet transform algorithm may be implemented as part of a non-dyadic spatial scaling method 160.

Figure 2:
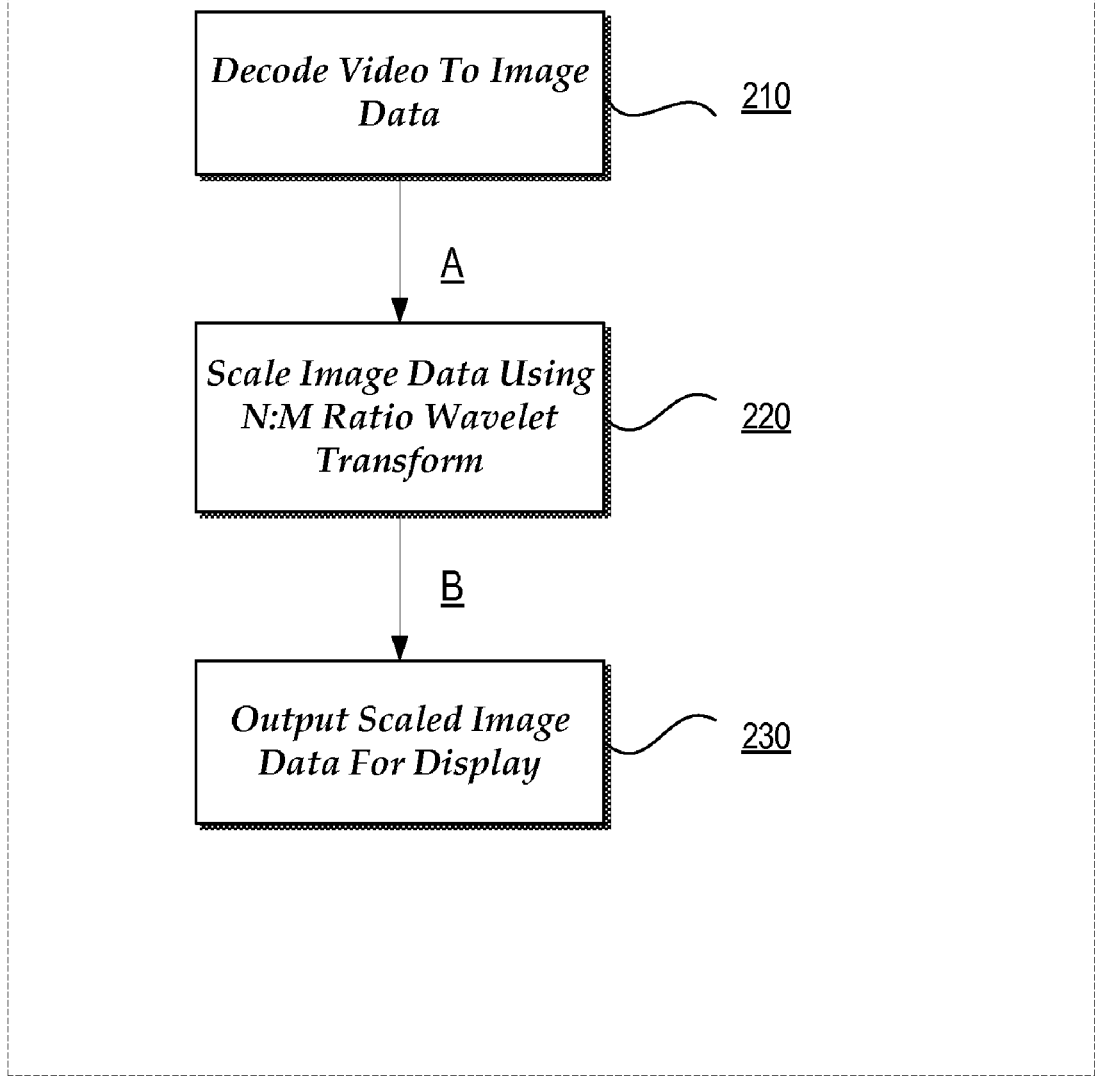
FIG. 2 illustrates an example non-dyadic spatial scaling method.

FIG. 2 illustrates an example non-dyadic spatial scaling method 160.

Block 210 may refer to an operation in which a previously compressed or encoded digital video or digital image may be either decoded or decompressed to produce an image data set representing a frame or frames of the original digital video or the digital image. Such decoding or decompression may include a reverse quantization operation. Such decoding or decompression techniques are known and will not be discussed here.

Block 220 refers to an operation in which the image data set produced at block 210 is scaled to a ratio of the original size of the image data set using a non-dyadic wavelet transform. Such an operation will be discussed more fully in the discussion of FIG. 3. More particularly, the letters "A" and "B" correspond to the letters "A" and "B" in FIG. 3 and indicate that block 210 flows to the arrow represented by the letter "A" in FIG. 3. And flow continues on to block 230 from the arrow represented by the letter "B" in FIG. 3.

Block 230 refers to an operation in which the scaled image data set produced at block 320 is passed to a compatible display device such that the scaled image data set may be rendered and displayed on the display device. Such an operation may be performed using any method to convert a set of image data to a rendered image.

Figure 3:
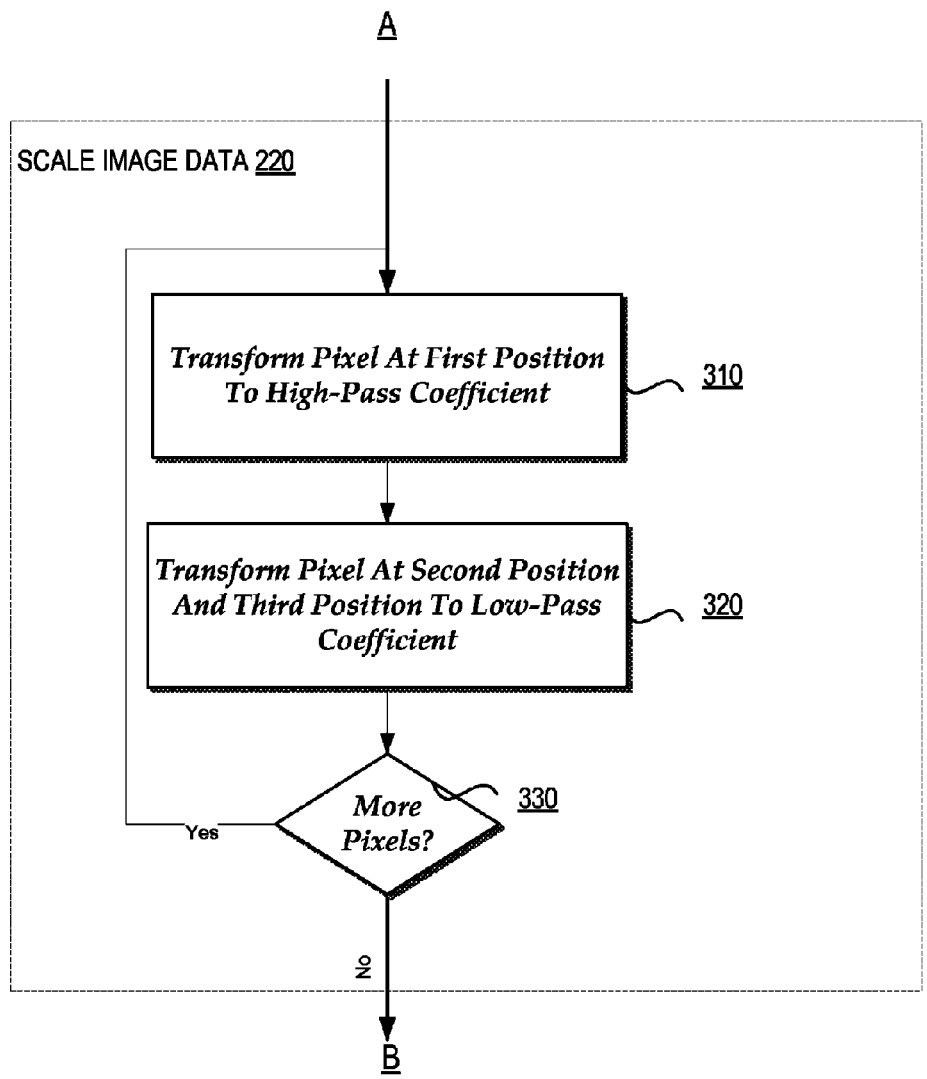
FIG. 3 illustrates an example method for scaling a digital image resolution using a non-dyadic ratio wavelet transform.

FIG. 3 illustrates an example method 220 for scaling a digital video or image resolution using a non-dyadic ratio wavelet transform. While the example method 220 may be used for any ratio of spatial scalability, the example method 220 will be demonstrated using a 3:2 ratio.

Block 310 refers to an operation in which a first portion of a set of data (x(n)) representing pixels corresponding to a frame of digital video or a digital image is transformed to a set of high-pass coefficients. Such an operation may be known as the prediction operation. Such an operation may also transform a pixel at a first position to a high-pass coefficient.

For example, the pixels at positions n=3k, where k may be a number identifying the current pixel included in x(n) being processed, may be transformed to a high-pass coefficient h(k). Such a high-pass transformation may be accomplished by implementing the following mathematical function in computer executable software: $h_k = x_{3k} + \{\alpha_1 \cdot (x_{3k-1} + x_{3k+1}) + \alpha_2 \cdot (x_{3k-2} + x_{3k+2})\}$, where $\alpha_1$ and $\alpha_2$ represent predetermined parameters intended to control the transformation to high-pass coefficients. Such predetermined parameters may be chosen before the method 320 is run and may be chosen using any process. For example, the predetermined parameters may be chosen to form an accurate prediction for pixels x(3k).

Block 320 may refer to an operation in which a second portion of the set of data x(n) is transformed to a set of low-pass coefficients. Such an operation may be known as the update operation. Such an operation may transform a pixel at a second position adjacent to the first position and a pixel at a third position adjacent to the second position to low-pass coefficients.

For example, the pixels at positions n=3k+1 and n=3k+2 are transformed to low-pass coefficients $l_{2k}$ and $l_{2k+1}$. Such a low-pass transformation may make use of the high-pass coefficients that may have been calculated at block 410 and may further calculate a high-pass coefficient for $h_{k+1}$. Such a low-pass transformation may be accomplished by implementing the following mathematical functions in computer executable software:

$$l_{2k} = \gamma \cdot x_{3k+1} + \beta_1 \cdot h_k + \beta_2 \cdot h_{k+1} \text{ and:}$$

$l_{2k+1} = \gamma \cdot x_{3k+2} + \beta_2 \cdot h_k + \beta_1 \cdot h_{k+1}$, where $\gamma$, $\beta_1$, and $\beta_2$ also represent predetermined parameters intended to control the transformation to low-pass coefficients. Such predetermined parameters may be chosen before the method 320 is run and may be chosen using any process. For example, the predetermined parameters may be chosen such that the average of the processed low-pass coefficients may have the same average of the original set of data x(n). The predetermined parameters may also be selected such that the low-pass transform has one vanishing moment, which may also be known as an approximation order.

Block 330 may refer to an operation to determine whether or not more pixels remain in the original set of data x(n) to be processed. In response to a positive determination, flow continues back to block 310. In response to a negative determination, flow continues back to block 230 of FIG. 2.

The invention claimed is:

1. A method for scaling digital image data using a non-dyadic lifting scheme wavelet transform, the method comprising:
    transforming data associated with a first pixel included in the digital image data at a first position to a high-pass coefficient;
    transforming data associated with a second pixel included in the digital image data at a second position adjacent to the first pixel to a first low-pass coefficient; and
    transforming data associated with a third pixel included in the digital image data at a third position adjacent to the second pixel to a second low-pass coefficient,
    wherein:
        the first low-pass coefficient and the second low-pass coefficient are determined by different predetermined mathematical functions,
        one or more parameters control the transforming the data associated with the second pixel to the first low-pass coefficient and the transforming the data associated with the third pixel to the second low-pass coefficient such that an average of the first low-pass coefficient and the second low-pass coefficient is substantially the same as an average of the data associated with the second pixel and the data associated with the third pixel, and
        the first pixel is adjacent to the second pixel that is subsequently adjacent to the third pixel.

2. The method of claim 1, further comprising repeating each of the transforming operations for data associated with each pixel included in the digital image data.

3. The method of claim 1, further comprising converting the first low-pass coefficient and the second low-pass coefficient to the digital image display format.

4. The method of claim 1, wherein transforming the data associated with the first pixel included in the digital image data at the first position is a lifting wavelet predict operation.

5. The method of claim 1, wherein transforming the data associated with the second pixel included in the digital image data at the second position is a lifting wavelet update operation.

6. The method of claim 1, wherein transforming that data associated with the third pixel included in the digital image data at the third position is a lifting wavelet update operation.

7. The method of claim 1, wherein transforming the data associated with the first pixel included in the digital image data further includes a predetermined first parameter to control the transforming.

8. The method of claim 1, wherein transforming the data associated with the first pixel included in the digital image data further includes a predetermined second parameter to control the transforming.

9. The method of claim 1, wherein transforming the data associated with the first pixel included in the digital image data further includes a predetermined third parameter to control the transforming.

10. The method of claim 1, wherein transforming the data associated with the second pixel included in the digital image data and transforming the data associated with the third pixel included in the digital image data further includes a predetermined third parameter to control the transforming.

11. The method of claim 1, wherein transforming the data associated with the second pixel included in the digital image data and transforming the data associated with the third pixel included in the digital image data further includes a predetermined fourth parameter to control the transforming.

12. The method of claim 1, wherein transforming the data associated with the second pixel included in the digital image data and transforming the data associated with the third pixel included in the digital image data further includes a predetermined fifth parameter to control the transforming.

13. A computer-storage media, wherein the computer-storage media does not include signals or a carrier wave, the computer-storage media comprising instructions stored that, when executed by one or more processors, direct one or more computers to perform operations including:
    transforming first pixel data associated with a first pixel included in digital image data to a set of high-pass coefficients;
    transforming second pixel data associated with a second pixel included in the digital image data to a first set of low-pass coefficients;
    transforming third pixel data associated with a third pixel included in the digital image data to a second set of low-pass coefficients; and
    determining whether additional pixels included in the digital image data remain for transformation,
    wherein:
        one or more parameters control the transforming the second pixel data to the first set of low-pass coefficients and the transforming the third pixel data to the second set of low-pass coefficients such that an average of the first low-pass coefficients and the second low-pass coefficients is substantially the same as an average of the second pixel data and third pixel data, and
        the first pixel is adjacent to the second pixel that is subsequently adjacent to the third pixel.

14. The computer-storage media of claim 13, wherein the at least one second pixel is adjacent the at least one first pixel.

15. The computer-storage media of claim 13, wherein the one or more parameters are predetermined.

16. The computer-storage media of claim 13, wherein the one or more parameters control transforming the at least one first pixel data, the at least second pixel data or the at least third pixel data.

17. An image rendering device comprising:
a display;
a non-dyadic spatial scalable codec stored in memory that transforms data associated with pixels included in a digital image, the transforming comprising:
applying a high-pass coefficient to a first pixel of the pixels;
applying a first low-pass coefficient to a second pixel of the pixels; and
applying a second low-pass coefficient to a third pixel of the pixels,
wherein:
the first pixel is adjacent to the second pixel that is subsequently adjacent to the third pixel, and
one or more parameters control the applying the first low-pass coefficient to the second pixel and the applying the second low-pass coefficient to the third pixel such that an average of the first low-pass coefficient and the second low-pass coefficient is substantially the same as an average of the data associated with the second pixel and the data associated with the third pixel.

18. The image rendering device of claim 17, wherein the one or more parameters are selected such that an average of the first low-pass coefficient and the second low-pass coefficient is substantially the same as an average of data associated with the first pixel and the second pixel.

19. The image rendering device of claim 17, wherein the transforming further comprises applying a second high-pass coefficient to a fourth pixel of the pixels that is adjacent to the third pixel, the second high-pass coefficient being determined based on the first low-pass coefficient and the second low-pass coefficient.

20. The computer-storage media of claim 13, wherein the one or more parameters are selected such that at least one of the transforming the second pixel data to the first set of low-pass coefficients and the transforming the third pixel data to the second set of low-pass coefficients have a single vanishing moment.

* * * * *